(12) United States Patent
Srinivasan et al.

(10) Patent No.: US 10,364,746 B2
(45) Date of Patent: Jul. 30, 2019

(54) TURBOMACHINERY INLET SCREEN

(71) Applicant: United Technologies Corporation, Hartford, CT (US)

(72) Inventors: Navindaran Srinivasan, El Cajon, CA (US); Francis Adams, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 517 days.

(21) Appl. No.: 15/034,176

(22) PCT Filed: Nov. 3, 2014

(86) PCT No.: PCT/US2014/063226
§ 371 (c)(1),
(2) Date: May 3, 2016

(87) PCT Pub. No.: WO2015/066361
PCT Pub. Date: May 7, 2015

(65) Prior Publication Data
US 2016/0281601 A1  Sep. 29, 2016

Related U.S. Application Data

(60) Provisional application No. 61/899,619, filed on Nov. 4, 2013.

(51) Int. Cl.
| *F02C 7/055* | (2006.01) |
| *F01D 25/24* | (2006.01) |
| *B64D 41/00* | (2006.01) |
| *F04D 29/70* | (2006.01) |

(52) U.S. Cl.
CPC .............. *F02C 7/055* (2013.01); *B64D 41/00* (2013.01); *F01D 25/24* (2013.01); *F04D 29/701* (2013.01); *Y02T 50/671* (2013.01)

(58) Field of Classification Search
CPC ............................... F02C 7/055; F04D 29/701
See application file for complete search history.

(56) References Cited

U.S. PATENT DOCUMENTS

| 4,119,534 A | 10/1978 | Porter et al. |
| 6,193,772 B1 | 2/2001 | Wiefel |
| 6,298,819 B1 | 10/2001 | Johnson |
| 6,824,582 B2 * | 11/2004 | Wilson ............... B01D 46/0005 55/385.3 |

(Continued)

FOREIGN PATENT DOCUMENTS

| CN | 201347903 Y | 11/2009 |
| DE | 2220854 A1 | 11/1973 |

OTHER PUBLICATIONS

International Search Report for International Application No. PCT/US2014/063226; dated Feb. 24, 2015.

(Continued)

*Primary Examiner* — Richard A Edgar
*Assistant Examiner* — Michael L Sehn
(74) *Attorney, Agent, or Firm* — Cantor Colburn LLP

(57) ABSTRACT

The present disclosure relates generally to an inlet screen for turbomachinery. The inlet screen may include a first screen and a second screen, wherein at least a portion of the first screen is offset from the second screen.

16 Claims, 6 Drawing Sheets

(56) References Cited

U.S. PATENT DOCUMENTS

| | | |
|---|---|---|
| 2002/0074282 A1 | 6/2002 | Herrmann et al. |
| 2004/0112020 A1 | 6/2004 | Wilson |
| 2009/0101760 A1* | 4/2009 | Ghogomu .............. B64D 15/12 244/53 R |
| 2011/0001003 A1 | 1/2011 | Krahl |
| 2011/0011055 A1 | 1/2011 | Troy |

OTHER PUBLICATIONS

Written Opinion for international Application No. PCT/US2014/063226; dated Feb. 24, 2015.
European Search Report for Application No. 14 85 8435 dated Jul. 20, 2017 (6 pgs.).

* cited by examiner

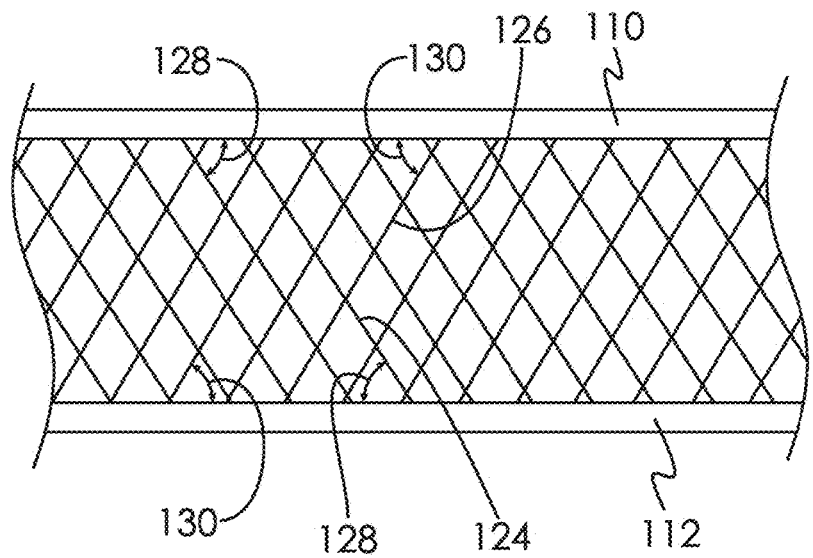
Fig. 6
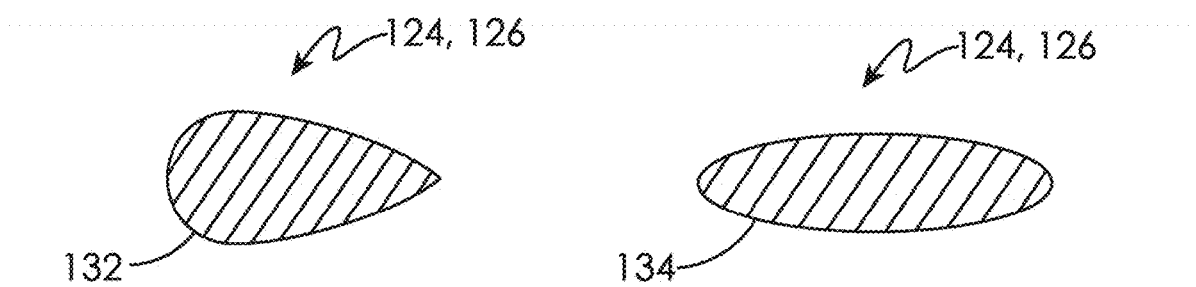
Fig. 7     Fig. 8

TURBOMACHINERY INLET SCREEN

CROSS-REFERENCE TO RELATED APPLICATIONS

The present application claims the benefit of and incorporates by reference herein the disclosure of U.S. Ser. No. 61/899,619 filed Nov. 4, 2013.

TECHNICAL FIELD OF THE DISCLOSURE

The present disclosure is generally related to turbomachinery and, more specifically, to an inlet screen for a turbomachine.

BACKGROUND OF THE DISCLOSURE

Many forms of turbomachinery comprise a gas acting on, or being acted upon, a plurality of airfoils. Examples of such turbomachinery include, but are not limited to, fans, propellers, windmills, compressors and turbines. For convenience of description, application of the presently disclosed embodiments to an aircraft mounted auxiliary power unit (APU) gas turbine engine is used herein by way of example, but the presently disclosed embodiments will find application in many forms of turbomachinery.

FIG. 1 schematically illustrates a portion of an APU, indicated generally at 10. APU 10 includes a turbine assembly 12 including impeller blades 14 contained therein. The impeller blades 14 pull air into the turbine assembly 12 from an air inlet duct 16. An air inlet screen 18 is provided between the air inlet duct 16 and the impeller blades 14 in an effort to prevent damage to the impeller blades 14 from soft foreign object ingestion (such as, for example, liquid or ice). Even with the provision of the air inlet screen 18, foreign object ingestion still causes damage in many APU installations in the field. This damage typically originates through operator procedures such as gate de-icing of the aircraft or maintenance water washing of the aircraft.

SUMMARY OF THE DISCLOSURE

In one embodiment, a turbomachinery inlet screen is disclosed, comprising: a first screen including a first edge and a second edge; and a second screen including a third edge and a fourth edge; wherein a first portion of the first screen is offset from the second screen; and wherein at least a second portion of the first screen is disposed adjacent the second screen.

In another embodiment, a turbomachine is disclosed, comprising: a compressor; a gas inlet arranged to direct a flow of gas to the compressor; and an inlet screen disposed between the gas inlet and the compressor, the inlet screen comprising: a first screen including a first edge and a second edge; and a second screen including a third edge and a fourth edge; wherein a first portion of the first screen is offset from the second screen; and wherein at least a second portion of the first screen is disposed adjacent the second screen.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 6 is a schematic partial plan view of a turbomachinery inlet screen in an embodiment.

FIG. 7 is a schematic cross-sectional view of a wire in a turbomachinery inlet screen in an embodiment.

FIG. 8 is a schematic cross-sectional view of a wire in a turbomachinery inlet screen in an embodiment.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
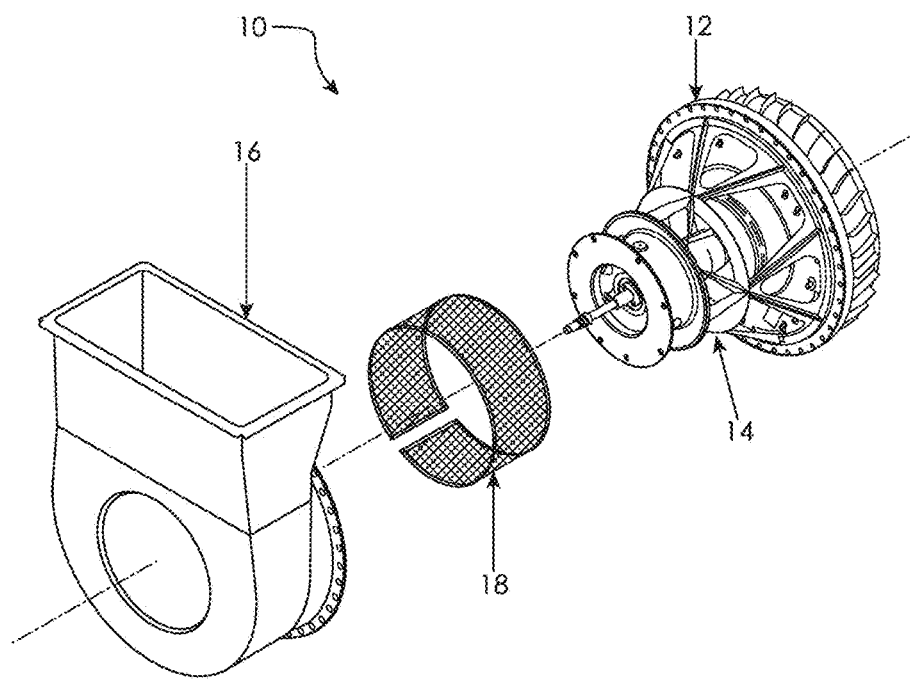
FIG. 1 is a schematic partial exploded perspective view of an auxiliary power unit gas turbine engine.
Figure 2:
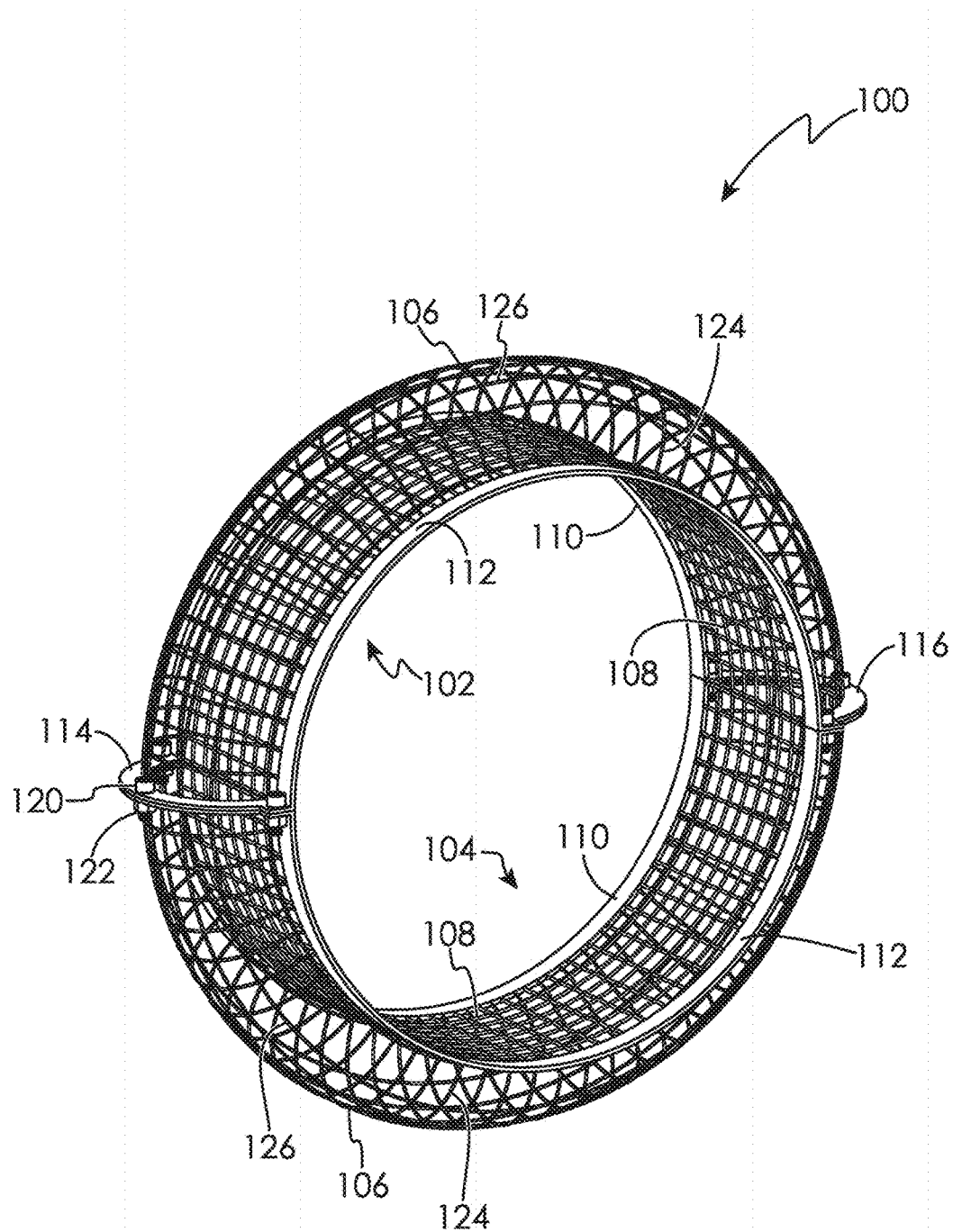
FIG. 2 is a schematic perspective view of a turbomachinery inlet screen in an embodiment.
Figure 3:
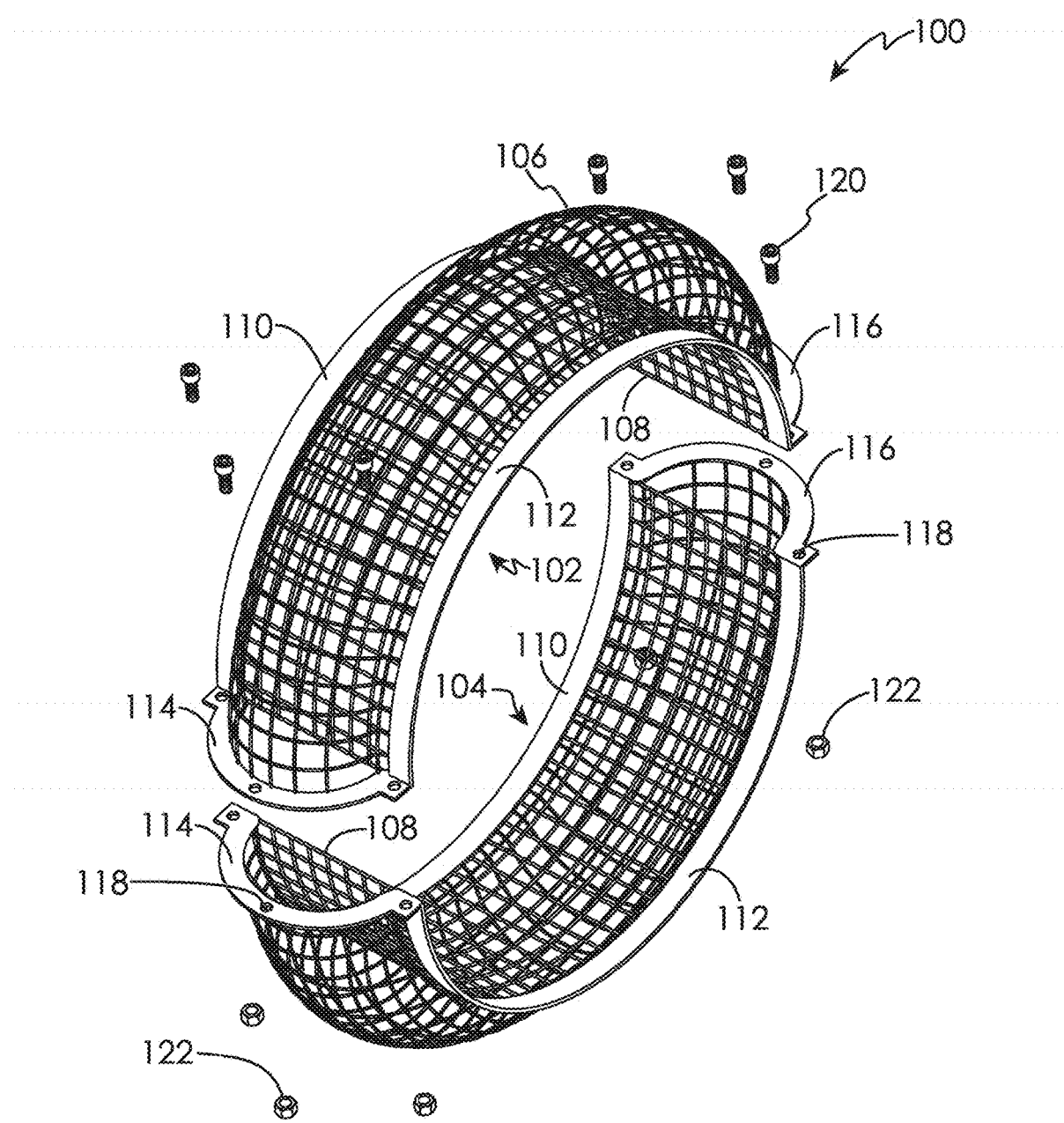
FIG. 3 is a schematic exploded perspective view of a turbomachinery inlet screen in an embodiment.
Figure 4:
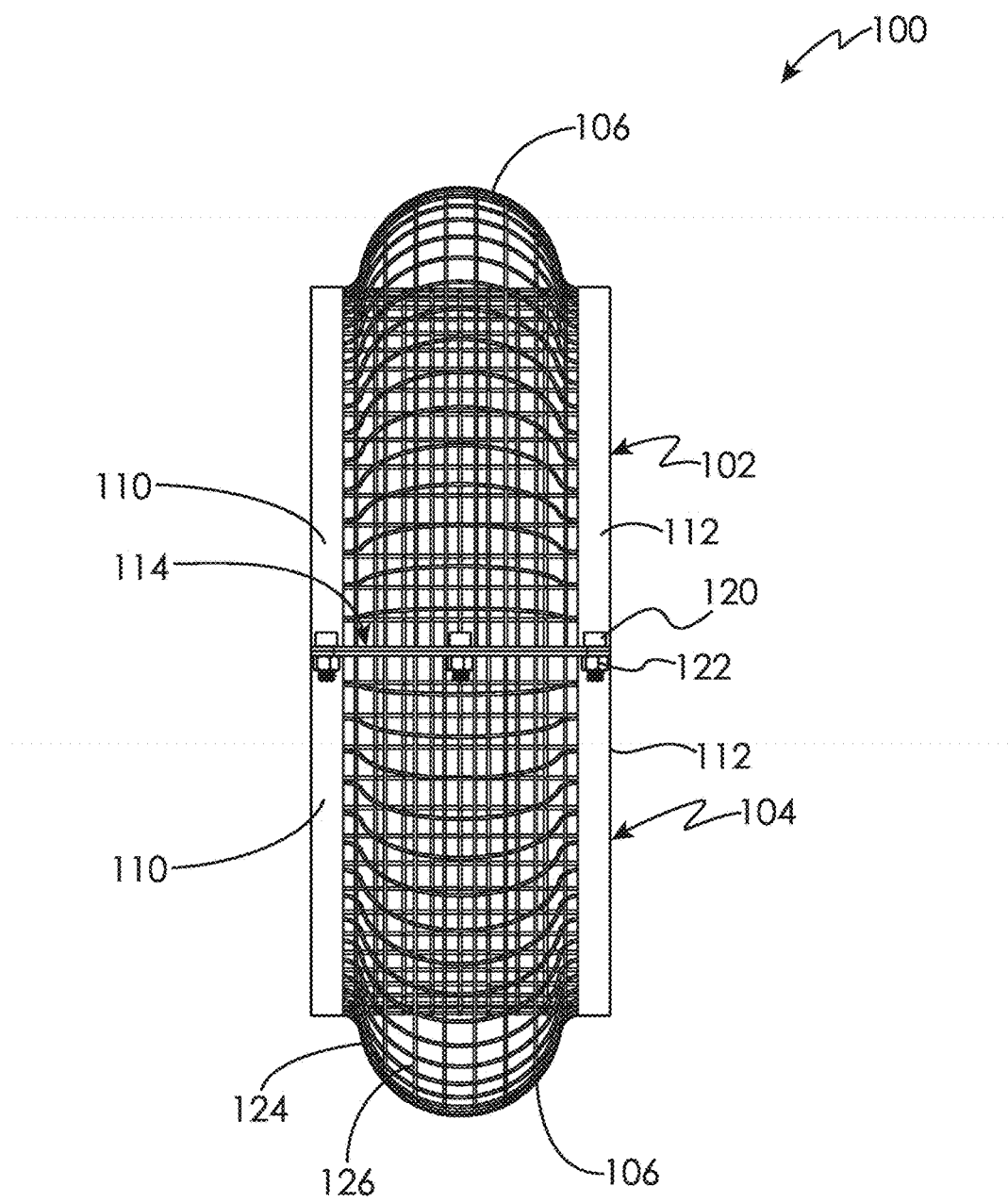
FIG. 4 is a schematic plan view of a turbomachinery inlet screen in an embodiment.
Figure 5:
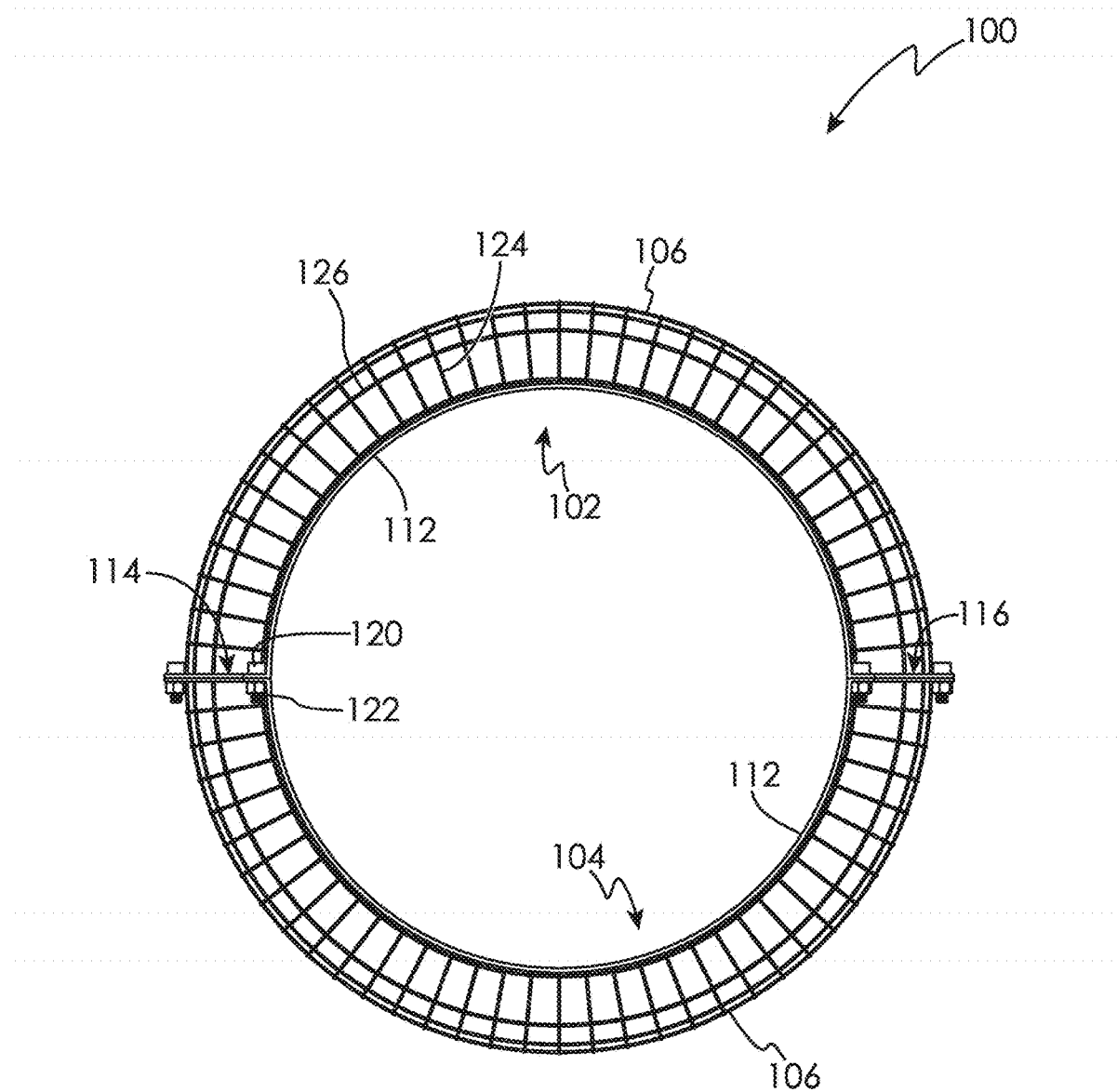
FIG. 5 is a schematic side elevational view of a turbomachinery inlet screen in an embodiment.

FIGS. 2-5 schematically illustrate an inlet screen 100 in an embodiment. The inlet screen 100 comprises a dual-layered inlet screen utilizing an offset matrix of wires to reduce the liquid or solid foreign object mass size and energy level prior to reaching the impeller blades 14, thereby mini-mizing the potential for impeller blade 14 damage. Although the inlet screen 100 illustrated in FIGS. 2-5 is sized and shaped to replace the air inlet screen 18 of FIG. 1, it will be appreciated that other embodiments of inlet screens are dif-ferently sized and shaped for their specific application. Addi-tionally, while the inlet screen 100 provides a screen for inlet air in an embodiment, other embodiment inlet screens may provide screens for other gases or liquids, and may be posi-tioned within a piece of turbomachinery rather than at the inlet of the turbomachine.

The inlet screen 100 may comprise at least two sections in an embodiment, such as the sections 102 and 104 of the illustrated embodiment. Other embodiments comprise more than two sections. Each of the sections 102 and 104 comprise at least a first screen 106 and a second screen 108. At least a portion of the first screen 106 is offset from the second screen 108. The edges of screens 106 and 108 may be coupled together by a first flange 110 and a second flange 112 in an embodiment. In an embodiment, the screen 106 has an arched configuration while the screen 108 is substantially flat when viewed in a cross-section transverse to the flanges 110 and 112. This results in the first screen 106 being offset from the second screen in areas between the flanges 110 and 112, while the first screen 106 is disposed adjacent the second screen 108 at the flanges 110 and 112. The flanges 110 and 112 may be coupled to one another by a third flange 114 and a fourth flange 116 in an embodiment. Each third flange 114 and fourth flange 116 may have one or more openings 118 formed therethrough for receipt of respective bolts 120 secured by nuts 122 in an embodiment. Other means of coupling the third flanges 114 and fourth flanges 116 to one another may be employed. In an embodiment, the inlet screen 100 covers a 360 degree arc. In another embodiment, the inlet screen 100 covers less than a 360 degree arc. In another embodiment, the inlet screen 100 has a non-arcuate shape and may be placed at another location in the inlet airflow stream.

In an embodiment, the screens 106 and 108 comprise grids of first wires 124 disposed transverse to the first flange 110 and second flange 112, and second wires 126 disposed parallel to the first flange 110 and second flange 112, thereby forming a grid having rectangular openings therein. In other embodiments, the first wires 124 and second wires 126 may be disposed at other angles to the first flange 110 and second flange 112. Referring to FIG. 6, the first wires 124 may be disposed at a first angle 128 to the first flange 110 and second flange 112, and second wires 126 may be disposed at a second angle 130 to the first flange 110 and second flange 112. The first angle 128 may be substantially the same as, or different than, the second angle 130. The grid of the first screen 106 may have the same arrangement as the grid of the second screen 108, or the grid of the first screen 106 may have a different arrangement than the grid of the second screen 108.

In an embodiment, the flanges 110, 112, 114 and 116 may comprise a corrosion-resistant steel, while the wires 124 and 126 may comprise an austenitic nickel-chromium-based alloy. Other materials may be used in other embodiments. The wires 124 and 126 may have any cross-sectional shape, such as round or square. In an embodiment, the wires 124 and 126 may have an airfoil shape 132 in cross-section, as schematically illustrated in FIG. 7. In another embodiment, the wires 124 and 126 may have an oval shape 134 in cross-section, as schematically illustrated in FIG. 8. The cross-sectional shapes 132, 134 may provide for more aerodynamic flow of gases or liquids through the screen 106 and/or 108.

When using the inlet screen 100, and assuming an air flow path first through the screen 106 and then through the screen 108, the first screen 106 will break any liquid mass entering the inlet into smaller sized droplets. Due to the first screen 106's arched geometry, it will extract much of the liquid's energy as it deflects the smaller droplets onto the offset second screen 108, which further reduces the droplet size and energy level while having minimal effect on the air flow.

In icing conditions, solid ice will accumulate on the first screen 106, but it will be spread over a larger area than would be the case with the flat screen 18. This larger area of ice may result in thinner ice. The second screen 108 serves as a secondary filter to either prevent ice shards from being ingested, or further reduce their size such that when they pass through the second screen 108, they are less likely to cause damage.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A turbomachinery inlet screen, comprising:
   a first screen including a first edge and a second edge, the first screen comprising an arched cross-sectional shape; and
   a second screen including a third edge and a fourth edge, the second screen is planar and comprises a substantially flat cross-sectional shape;
   wherein the first edge is secured to the third edge by a first flange and the second edge is secured to the fourth edge by a second flange,
   wherein a first portion of the first screen is offset from the second screen; and
   wherein at least a second portion of the first screen is disposed adjacent the second screen; and
   wherein:
   a cavity formed between the first screen and the second screen forms an annular ring with a hemisphere-shaped cross-section, an inner cylindrical surface, and an outer arcuate surface, and
   the first screen forms the outer arcuate surface of the annular ring and the second screen forms the inner cylindrical surface of the annular ring.

2. The turbomachinery inlet screen of claim 1, wherein:
   the first edge is disposed adjacent the third edge;
   the second edge is disposed adjacent the fourth edge; and
   the first portion is disposed between the first edge and the second edge.

3. The turbomachinery inlet screen of claim 1, wherein at least one of the first and second screens comprises:
   a plurality of first wires disposed substantially parallel to each of the first and second flanges; and
   a plurality of second wires disposed substantially perpendicular to each of the first and second flanges.

4. The turbomachinery inlet screen of claim 1, wherein at least one of the first and second screens comprises:
   a plurality of first wires disposed at a first angle to each of the first and second flanges; and
   a plurality of second wires disposed at a second angle to each of the first and second flanges.

5. The turbomachinery inlet screen of claim 4, wherein the first angle is substantially the same as the second angle.

6. The turbomachinery inlet screen of claim 1, wherein:
   the first screen and the second screen each comprise a plurality of wires; and
   each plurality of wires comprises an austenitic nickel-chromium-based alloy.

7. The turbomachinery inlet screen of claim 1, wherein the first and second flange comprise corrosion-resistant steel.

8. The turbomachinery inlet screen of claim 1, wherein the inlet screen covers a 360 degree arc.

9. A turbomachine, comprising:
   a compressor;
   a gas inlet arranged to direct a flow of gas to the compressor; and
   an inlet screen disposed between the gas inlet and the compressor, the inlet screen comprising:
   a first screen including a first edge and a second edge, the first screen comprising an arched cross-sectional shape; and
   a second screen including a third edge and a fourth edge, the second screen is planar and comprises a substantially flat cross-sectional shape;
   wherein the first edge is secured to the third edge by a first flange and the second edge is secured to the fourth edge by a second flange,
   wherein a first portion of the first screen is offset from the second screen; and
   wherein at least a second portion of the first screen is disposed adjacent the second screen; and
   wherein:

a cavity formed between the first screen and the second screen forms an annular ring with a hemisphere-shaped cross-section, an inner cylindrical surface, and an outer arcuate surface, and the first screen forms the outer arcuate surface of the annular ring and the second screen forms the inner cylindrical surface of the annular ring.

10. The turbomachine of claim 9, wherein:
the first edge is disposed adjacent the third edge;
the second edge is disposed adjacent the fourth edge; and
the first portion is disposed between the first edge and the second edge.

11. The turbomachine of claim 9, wherein at least one of the first and second screens comprises:
a plurality of first wires disposed substantially parallel to each of the first and second flanges; and
a plurality of second wires disposed substantially perpendicular to each of the first and second flanges.

12. The turbomachine of claim 9, wherein at least one of the first and second screens comprises:
a plurality of first wires disposed at a first angle to each of the first and second flanges; and
a plurality of second wires disposed at a second angle to each of the first and second flanges.

13. The turbomachine of claim 12, wherein the first angle is substantially the same as the second angle.

14. The turbomachine of claim 9, wherein:
the first screen and the second screen each comprise a plurality of wires; and
each plurality of wires comprises an austenitic nickel-chromium-based alloy.

15. The turbomachine of claim 9, wherein the turbomachine is selected from the group consisting of: a gas turbine engine, an auxiliary power unit, a fan, a propeller, a windmill, a compressor and a turbine.

16. The turbomachine of claim 9, wherein the inlet screen covers a 360 degree arc.

* * * * *